UNITED STATES PATENT OFFICE.

DANL. E. SOMES, OF WASHINGTON, DISTRICT OF COLUMBIA, ASSIGNEE, BY MESNE ASSIGNMENTS, OF HIMSELF.

IMPROVEMENT IN CURING PROVISIONS.

Specification forming part of Letters Patent No. 30,658, dated November 13, 1860; Reissue No. 1,097, dated December 11, 1860; Reissue No. 2,096, dated October 24, 1865.

*To all whom it may concern:*

Be it known that I, DANIEL E. SOMES, formerly of Biddeford, in the county of York and State of Maine, now of the city of Washington, in the District of Columbia, have made a new and useful improvement in packing-houses and buildings to be used for the purpose of salting, curing, and preserving meats, fish, and other substances; and I hereby declare that the following is a full and exact description of the same.

It is well known that for the successful and perfect curing of meats the packing-houses should be maintained at a nearly uniform and low temperature. The temperature generally preferred is from 40° to 50° Fahrenheit. It is also known that there is everywhere beneath the surface of the earth a point where the temperature is the same as the mean annual temperature of the place.

Now, my invention consists in constructing packing-houses and buildings to be used in salting, curing, and preserving meats, fish, and other substances, and in preserving other articles which must be kept at a low and uniform temperature, by sinking shafts in the ground, so as to attain about the mean annual temperature of the place, and when this temperature is not sufficiently low for my purpose, still further lowering of the temperature by means of artificial refrigeration. In latitudes where the mean temperature is sufficiently low for the purpose of curing meat, all that is necessary in constructing a packing-house according to my invention is to form a shaft or excavation of the proper size and form, and of the proper depth below the surface of the earth to arrive at the constant and mean temperature of the place. To protect the shaft from storms, and to prevent the entrance of warm air from withont, a building with thick walls may be erected at the surface of the earth and over the excavation, with such means of ventilation as may be desirable. In such a building meat may be cured and preserved at all seasons of the year. In latitudes where the mean temperature is not sufficiently low for the purpose of curing and preserving meats, &c., then it is necessary to use some suitable means of artificial refrigeration, so as to reduce the temperature to the proper degree below the mean temperature of the place. This may be accomplished by means of ice, cooling-mixtures, and the like. In some warm climates ice is produced by sprinkling straw with water and placing it in the bottom of a deep well or pit dug in the earth. The radiation of heat being toward the top of the pit, and there being no side currents of warm air, an intense degree of cold is produced, so much so that thin layers of ice are formed in a single night. This mode of cooling is applicable in carrying out my invention. By having the cover over the shaft so constructed that it may be removed during clear nights, the interior will be cooled by radiation, as already explained. When ice or cooling-mixtures are employed, they may be introduced in a jacket surrounding the shaft or excavation, or in any other suitable manner. Any other suitable means of artificial refrigeration may be used.

Buildings constructed according to the principles of this invention may be used for salting and curing meat, fish, and other articles of food; also for curing and salting hides, and for preserving other substances.

By means of my invention meat may be properly and safely packed in any latitude and at any season of the year. As packing-houses are usually constructed, there is only a brief period that meats can be packed with success, even in middle and temperate latitudes, and this brief period is liable to constant interruption by reason of the daily change of temperature at the earth's surface, it being well known that curing cannot be done properly when the meat is allowed to freeze, or is left for a few hours at the temperature of putrefactive fermentation.

Having thus described my invention, I desire it to be understood that I do not restrict myself to any particular form or arrangement of the shafts or excavations, nor to the means to be employed to aid in cooling, since these may be greatly varied without departing from the nature of my invention, the essential point of which consists in sinking a shaft or excavation in any latitude to a depth to attain about the mean temperature of the latitude where it is low enough, and when it is not low enough to make it so by artificial means, as described, so as to obtain a uniform and sufficiently low temperature for the salting and preserving of meats, fish, and other substances, as above described.

What I claim, and desire to secure by Letters Patent of the United States, is—

1. Constructing packing-houses and other similar buildings and structures for the purpose of salting, curing, preserving, and storing articles of food, hides, and other substances, substantially in the manner herein set forth and described.

2. Salting, curing, and preserving food, hides, &c., in shafts and vaults excavated in the earth to a depth sufficient, practically, to attain the lowest invariable temperature of the earth at the place where they are sunk, as set forth, and for the purpose specified.

3. Cooling such excavations and shafts by artificial means, in the manner and for the purpose set forth.

D. E. SOMES.

Witnesses:
J. C. SMITH,
F. C. SOMES.